United States Patent
Kunert et al.

[11] Patent Number: 5,095,669
[45] Date of Patent: Mar. 17, 1992

[54] SPACER FOR WINDSHIELD BRACKET

[75] Inventors: Heinz Kunert, Cologne; Gerd Cornils, Merzenich-Girbelsrath; Heinrich Schnitter, Simmerath, all of Fed. Rep. of Germany

[73] Assignee: Saint Gobain Vitrage International, Courbevoie, France

[21] Appl. No.: 531,191

[22] Filed: May 31, 1990

Related U.S. Application Data

[63] Continuation-in-part of Ser. No. 450,345, Dec. 13, 1989, abandoned, and a continuation-in-part of Ser. No. 436,280, Nov. 14, 1989, and a continuation-in-part of Ser. No. 360,654, Jun. 24, 1989, Pat. No. 4,933,032.

[51] Int. Cl.$^5$ .................................................. E06B 3/00
[52] U.S. Cl. .................................................. 52/208
[58] Field of Search ............... 52/171, 208, 397, 400, 52/788, 823; 156/108, 500; 296/84.1, 93, 96.2, 96.21, 200

[56] References Cited

U.S. PATENT DOCUMENTS

| | | | |
|---|---|---|---|
| 3,416,833 | 12/1968 | Griffin | 296/93 |
| 3,478,475 | 11/1969 | Strack | 52/208 |
| 3,478,475 | 11/1969 | Strack | 52/208 |
| 3,707,521 | 12/1972 | De Santis | 260/37 |
| 3,774,363 | 11/1973 | Kent | 52/208 X |
| 3,779,794 | 12/1973 | De Santis | 117/72 |
| 4,151,620 | 5/1979 | Heuzonter | 296/84.1 X |
| 4,296,961 | 10/1981 | Hunt et al. | 52/208 |
| 4,433,010 | 2/1984 | Pedain et al. | 427/160 |
| 4,551,372 | 11/1985 | Kunert | 428/38 |
| 4,571,278 | 2/1986 | Kunert | 156/108 |
| 4,581,276 | 4/1986 | Kunert et al. | 428/157 |
| 4,606,159 | 8/1986 | Kunert | 52/208 |
| 4,628,655 | 12/1986 | Scheiderer | 52/397 |
| 4,635,420 | 1/1987 | Batky | 52/309 |
| 4,648,222 | 3/1987 | Miyata et al. | 52/208 |
| 4,681,794 | 7/1987 | Kunert et al. | 428/188 |
| 4,683,694 | 8/1987 | Ziegler | 52/208 |
| 4,704,175 | 11/1987 | Kunert et al. | 156/108 |
| 4,765,673 | 8/1988 | Frabotta et al. | 52/400 X |
| 4,775,570 | 10/1988 | Ohlenforst et al. | 428/83 |
| 4,839,122 | 6/1989 | Weaver | 264/129 |
| 4,876,132 | 10/1989 | Kunert | 428/43 |
| 4,879,853 | 11/1989 | Braendle et al. | 52/397 X |
| 4,881,773 | 11/1989 | Ichinose | 156/108 X |
| 4,888,072 | 12/1989 | Ohlenforst et al. | 156/108 |
| 4,910,071 | 3/1990 | Kunert | 428/192 |
| 4,933,032 | 6/1990 | Kunert | 156/108 |
| 4,938,521 | 7/1990 | Kunert | 296/96.21 |

FOREIGN PATENT DOCUMENTS

| | | | |
|---|---|---|---|
| 0024501 | 4/1967 | European Pat. Off. | |
| 22131 | 1/1981 | European Pat. Off. | 52/397 |
| 0121480 | 10/1984 | European Pat. Off. | |
| 148797 | 7/1985 | European Pat. Off. | 296/96.21 |
| 298788 | 1/1989 | European Pat. Off. | |
| 307317 | 1/1989 | European Pat. Off. | |
| 319262 | 6/1989 | European Pat. Off. | 296/93 |
| 3323006 | 1/1985 | Fed. Rep. of Germany | 296/201 |
| 3447271 | 6/1986 | Fed. Rep. of Germany | |
| 3536806 | 4/1987 | Fed. Rep. of Germany | |
| 3741899 | 12/1987 | Fed. Rep. of Germany | |
| 3627536 | 2/1988 | Fed. Rep. of Germany | |
| 57-58509 | 4/1982 | Japan | |
| 161218 | 8/1985 | Japan | 296/96.21 |
| 62-163818 | 7/1987 | Japan | |
| 192608 | 8/1988 | Japan | 296/96.21 |
| 2143569 | 2/1985 | United Kingdom | 296/96.21 |
| 2147244 | 5/1985 | United Kingdom | 52/171 |

Primary Examiner—David A. Scherbel
Assistant Examiner—Michele A. Van Patten
Attorney, Agent, or Firm—Pennie & Edmonds

[57] ABSTRACT

A motor vehicle glazing prepared for installation is provided with one or more profiled spacers produced by extrusion of an extrudable polymer directly onto the glazing. A first spacer is provided along its outer periphery with an lip portion projecting beyond the peripheral area of the glazing. In the installed position of the glazing the lip portion rests against the window frame flange running parallel to the peripheral area of the glazing and acts, upon insertion of the glazing and during the setting process of the assembly adhesive, as a support and centering element for the glazing. Adjacent the first profiled spacer, and attached to the glazing is the assembly adhesive bead. Optionally, a second spacer is provided also adjacent the adhesive bead for retaining the adhesive bead between the first and second spacers and for adding support.

20 Claims, 1 Drawing Sheet

SPACER FOR WINDSHIELD BRACKET

CROSS-REFERENCE TO RELATED APPLICATIONS

This application is a continuation-in-part of applications Ser. No. 450,345 filed Dec. 13, 1989 now abandoned; Ser. No. 436,280, filed Nov. 14, 1989; and Ser. No. 360,654, filed June 24, 1989, now U.S. Pat. No. 4,933,032.

FIELD OF THE INVENTION

The invention relates to a glazing provided for bonding to the attachment flange of a window frame, in particular a motor vehicle glazing, with a profiled spacer, preferably produced by extrusion of a polymer on the side of the glazing opposite the attachment flange. The profiled spacer acts as a support and centering element upon insertion of the glazing, as well as during the setting of the assembly adhesive. The invention describes the process for the production of such a glazing as well as a process and apparatus for performing the process.

BACKGROUND OF THE INVENTION

Motor vehicle glazings are often attached today by direct bonding to the attachment flange of the window frame in the motor vehicle body. It has proven useful to prepare the glazing prior to the assembly process, by providing the glazing with an adhesive material that is produced by extrusion on the glazing, which after setting, acts as an intermediate body between the glazing and the assembly adhesive. This eliminates the requirement of cleaning and priming the glazing on the assembly line of the motor vehicle plant, necessary for the bonding of the glazing, which results in the insertion of the glazing into the body being performed more economically. This process is known, for example, from U.S. Pat. No. 4,571,278.

When inserting the glazing into the window frame of the body, the glazing must be correctly positioned and then held stationary during the setting phase of the assembly adhesive. As a rule, additional assembly aids and/or support elements are required for this purpose. European Patent application 0 307 317 describes a motor vehicle glazing comprised of a spacer oriented perpendicular to the glazing surface and having a support surface that bears the weight component of the glazing running in the direction of the glazing plane in the installation position, and a bracket having a support element that interacts with the support surface of the spacer. The support surface and support element cooperate to properly position and set the glazing. This known solution, however, requires additional support elements in the window frame. Further, it is required that the support elements in the window frame lie at a constant distance from the outwardly visible periphery of the window frame. Otherwise, the junction between the peripheral area of the glazing and the flange of the window frame opposite the peripheral area will exhibit a varying width, which results in the requirement to cover this juncture with an additional covering profile.

One object of the invention is to configure a motor vehicle glazing comprised of an extruded profiled spacer so that the proper centering and bracing of the glazing, during the setting phase of the assembly adhesive, is guaranteed without additional support elements being required in the window frame.

SUMMARY OF THE INVENTION

The invention provides a profiled spacer which acts as a support and centering element for the glazing. The profiled spacer includes a lip portion which is oriented approximately parallel to the glazing surface and which projects beyond the peripheral area or edge of the glazing. The lip portion, in the installation position of the glazing, rests against the flange of the window frame running parallel to the peripheral area of the glazing.

The profiled spacer described in the invention is dimensioned in thickness and length so that the lip portion may deform during insertion of the glazing into the window frame. The lip portion is bent from about 45 to 90 degrees relative to the original orientation of the lip portion. While the lip portion of the spacer carries the dead weight of the glazing on the one side, it simultaneously assumes the centering and sealing function for the surrounding gap between the peripheral area of the glazing and the flange of the window frame opposite the peripheral area. This results in said gap having a constant width. The covering of said gap by an additional sealing or decorative profile is therefore, no longer necessary. Hence, an extraordinarily economical solution is provided by the invention.

A bead of adhesive lies adjacent the profiled spacer, in direct contact with the window frame and either the glazing or the spacer. Optionally, a second spacer is employed for increased support. The second spacer also lies adjacent the adhesive bead, preferably opposite the first spacer so as to retain the adhesive bead between the two spacers.

If the gap remaining between the peripheral area of the glazing and the opposite flange of the window opening is not covered by an additional sealing or decorative profile, the lip portion projecting beyond the peripheral area of the glazing is outwardly visible. In this case, special measures can be taken to configure the transition zone between the beginning and the end of the extruded profile spacer to obtain a continuous spacer.

BRIEF DESCRIPTION OF THE DRAWINGS

Further details and advantages of the invention are described in detail below based on the drawings, wherein.

DETAILED DESCRIPTION OF THE PREFERRED EMBODIMENTS

Figure 1:
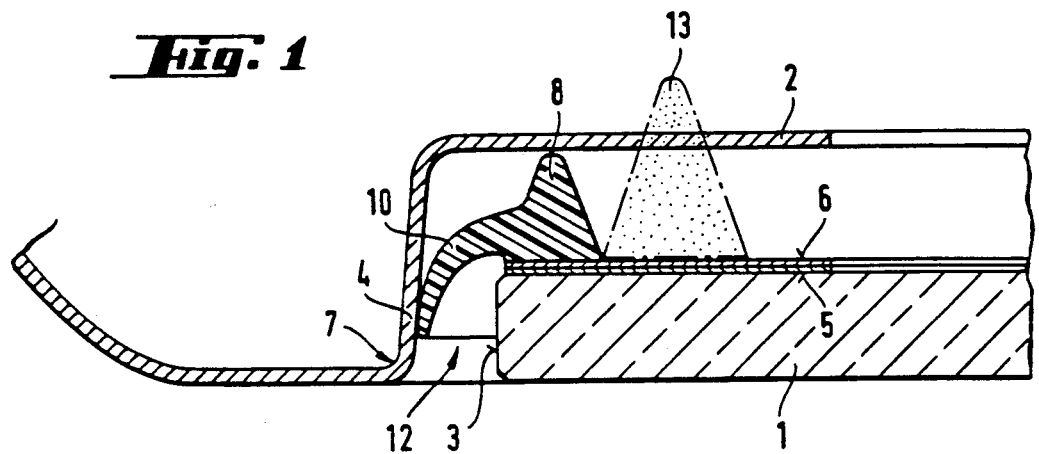
FIG. 1 discloses a motor vehicle glazing made according to the invention in the installed state, in the form of a sectional drawing.

In the case represented in FIG. 1, glazing 1 is a rear window that is inserted in the corresponding window opening of a motor vehicle body. The window opening is delineated by sheet metal member 7, which consists of attachment flange 2 and frame section 4. Flange 2 runs parallel to the glazing surface, and frame section 4 runs parallel to peripheral area 3 of glazing 1. Glazing 1 is represented as a monolithic glazing, but said glazing may also be comprised of a multilayer laminated glazing. Along the periphery of glazing 1 there is provided, on the side facing attachment flange 2, an opaque layer 5 that consists, for example, of a baked enamel. The object of layer 5 is to prevent the adhesive compound lying behind layer 5 from being outwardly visible and simultaneously to protect the adhesive compound from UV rays. An optional primer coating 6 may be provided along the enamel layer 5.

Glazing 1 is provided on the side facing the attachment flange 2 with a profiled spacer 8, made of a polymer that is elastomeric in the set state. Profiled spacer 8 adheres to opaque layer 5, or to optional primer coating 6.

Profiled spacer 8 exhibits a continuous lip portion 10. Before installation of glazing 1 in the window frame, lip portion 10 has a straight form, and is oriented approximately parallel to the glazing surface, projecting beyond peripheral area 3 of glazing 1 by about 5 to 10 mm. During insertion of the glazing into the window frame, lip portion 10 is bent back as shown and rests over its entire periphery against the window frame section 4 which runs parallel to peripheral area 3 of the glazing. During insertion of the glazing into the window frame, glazing 1 is automatically centered, so that a gap 12 of even width remains all around glazing 1. In the lower area of glazing 1, lip portion 10 acts to support the glazing weight, so that no additional support measures are required during the setting process of the assembly adhesive. Finally, lip portion 10 achieves the further object of closing and sealing the gap 12.

The dimensioning of lip portion 10, i.e., in length and thickness, shall be selected so the stated objects of lip portion 10 are fulfilled in an optimal way.

The connection of glazing 1 equipped in advance with the profiled spacer 8, to the attachment flange 2 is performed with the aid of an assembly adhesive bead 13. The assembly adhesive bead 13 consists of a polymer (for example, a moisture setting one-component polyurethane) that adheres solidly and permanently to enamel layer 5 or optional primer coating 6. The pressing of the glazing 1 against the attachment flange 2 required during the setting time of adhesive bead 13, is also guaranteed by the lip portion 10 of the profiled spacer 8 which, because of its high coefficient of friction and its relative stiffness, absorbs restoring forces possibly exerted by the adhesive bead 13.

The production of profiled spacer 8 is performed, with the aid of the extrusion technique generally known in the art, by extruding a suitable polymer that adheres to the glazing by bonding. As for polymers used in the production of the profiled spacer 8, one-component polyurethane prepolymers in paste form that set after extrusion, under the influence of atmospheric moisture, into high modulus elastomers are acceptable. Such polyurethane systems are described in U.S. Pat. No. 3,779,794. Polyurethane systems on a two-component basis may also be used. For example, adhesive systems as described in European patents 0 083 797 and 0 024 501. Depending on the adhesive compound used, the surface on which the admissive material is applied is to be pretreated in the required manner and as an option, provided with one or more suitable priming layers.

To produce the profiled spacer 8 on the glazing 1, a method and apparatus are described in U.S. patent application Ser. No. 436,280 filed Nov. 14, 1989, of which this application is a continuation-in-part and the content of which is expressly incorporated herein by reference thereto. This spacer 8 is preferably applied to the glazing 1 by an extrusion technique.

Figure 2:
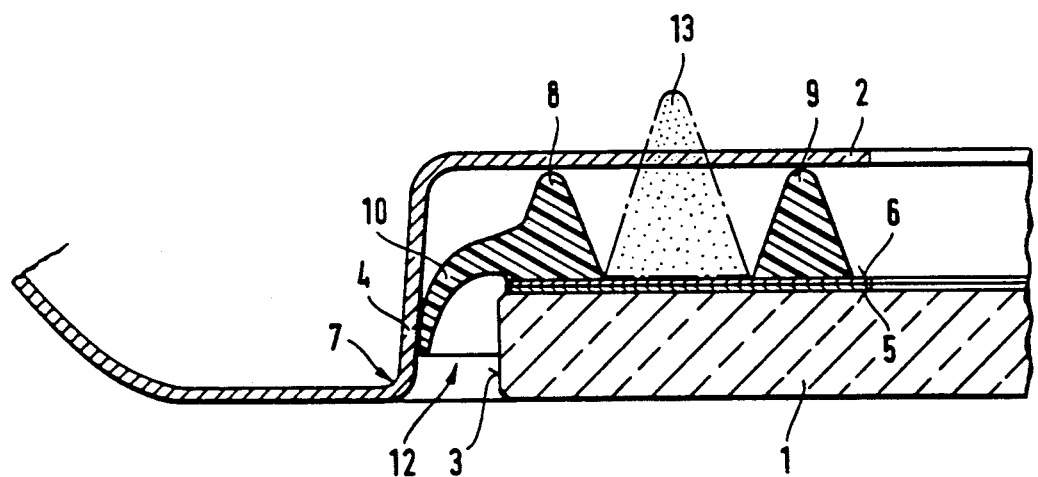
FIG. 2 discloses a dual spacer assembly and bracket according to the invention.

FIG. 2 illustrates another embodiment of the present invention. In this embodiment there exists dual spacers 8 and 9 surrounding the bead of adhesive 13. Spacer 9 is provided for additional support, and retains bead 13 between spacers 8 and 9.

The embodiments of the invention described relate to the rear window or windshield of a motor vehicle. But the invention can also be applied in the same manner to glazings intended for doors, side windows, end gates, sun roofs, sliding roofs, rear flaps, and headlight flaps of motor vehicles. Further, the invention can be applied in other areas wherever glazings are attached in a frame by the adhesive method. In the vehicle field, for example, it may be used successfully also for the windows of trailers and railroad cars. It can also be used equally successfully for the windows of window openings in the construction sectors as well as for the installation of glazings in appliances and furniture, for example, household refrigerators.

What is claimed is:

1. A window, comprising:
   a glazing having a weight;
   a peripheral sheet metal bracket oriented parallel to at least one edge of the glazing;
   a first spacer attached to one surface of the glazing proximate to a peripheral edge thereof and adjacent the bracket for supporting the weight of the glazing, the first spacer being provided with means for centering and aligning the glazing upon the bracket including at least one peripheral portion having a cross-sectional configuration and a support surface for contacting the bracket, and means operatively associated with the bracket for aligning the glazing at a predetermined uniform distance away from said bracket; and
   a bead of adhesive positioned adjacent said glazing edge periphery for securing the glazing to the bracket.

2. The window of claim 1 wherein the centering means comprises a lip portion which is oriented essentially parallel to the glazing surface and extends beyond the edge of the glazing.

3. The window of claim 2 wherein the first spacer lip portion has a length which is sufficient to prevent the glazing edge from contacting the bracket.

4. The window of claim 2 wherein the first spacer and lip portion are formed by extrusion of an elastomer, and are mounted upon an enamel layer on the glazing.

5. The window of claim 4 wherein the bead of adhesive is mounted upon the enamel layer.

6. The window of claim 5 further comprising a second spacer adjacent said adhesive bead for retaining said adhesive bead between said first and second spacers.

7. The window of claim 6 wherein said second spacer is formed by extrusion of an elastomer, and is mounted upon said enamel layer.

8. The window of claim 1 wherein the alignment means comprises a rounded top portion of said first spacer which contacts the bracket to support the glazing at said predetermined distance therefrom.

9. A window, comprising:
   a glazing having a weight;
   a peripheral sheet metal bracket attached to a support and oriented parallel to at least one edge of the glazing;
   a first spacer attached to one surface of the glazing proximate to a peripheral edge thereof and adjacent the bracket for supporting the weight of the glazing, the first spacer being provided with means for centering and aligning the glazing upon the bracket including at least one peripheral portion having a cross-sectional configuration and a support surface for contacting the bracket to provide a force for centering the glazing upon the bracket, the first spacer peripheral portion further comprising a lip portion initially oriented essentially parallel to the glazing surface and extending beyond the edge of the glazing, the lip portion resiliently bending and contacting the bracket when the glazing is placed thereupon to provide the centering force, and means operatively associated with the bracket for aligning the glazing at a predetermined uniform distance away from the bracket; and a bead of adhesive positioned adjacent to said glazing edge periphery for securing the glazing to the bracket.

10. The window of claim 9 wherein the first spacer lip portion has a length which is sufficient to prevent the glazing edge from contacting the bracket.

11. The window of claim 10 wherein the spacer and lip portion are formed by extrusion of an elastomer, and are mounted upon an enamel layer on the glazing.

12. The window of claim 11 wherein the bead of adhesive is mounted upon the enamel layer.

13. The window of claim 12 further comprising a second spacer adjacent to said adhesive head for retaining said adhesive bead between said first and second spacers.

14. The window of claim 13 wherein said second spacer is formed by extrusion of an elastomer, and is mounted upon said enamel layer.

15. The window of claim 9 wherein the alignment means comprises a rounded top portion of said first spacer which contacts the bracket to support the glazing at said predetermined distance therefrom.

16. A window, comprising:

a glazing having a weight;

a peripheral sheet metal bracket attached to a support and oriented parallel to at least one edge of the glazing;

a first spacer attached to one surface of the glazing proximate to a peripheral edge thereof and adjacent the bracket for supporting the weight of the glazing, the first spacer being provided with means for centering and aligning the glazing upon the bracket including at least one peripheral portion having a cross-sectional configuration and a support surface for contacting the bracket to provide a force for centering the glazing upon the bracket, said first spacer peripheral portion including a lip portion which is initially oriented essentially parallel to the glazing surface and extending beyond the edge of the glazing for resiliently bending and contacting the bracket when the glazing is placed thereupon to provide the centering force and means operatively associated with the bracket for aligning the glazing at a predetermined distance away from the bracket;

a bead of adhesive positioned adjacent said glazing edge periphery for securing the glazing to the bracket; and a second spacer separate and spaced from said first spacer and adjacent said adhesive bead for contacting the bracket to assist in the alignment of the glazing upon the bracket and for retaining said adhesive bead between said first and second spacers.

17. The window of claim 16 wherein the first spacer lip portion has a length which is sufficient to prevent the glazing edge from contacting the bracket.

18. The window of claim 17 wherein said first and second spacers and said lip portion are formed by extrusion of an elastomer, and are mounted upon an enamel layer on the glazing.

19. The window of claim 18 wherein said bead of adhesive is mounted upon the enamel layer.

20. The window of claim 16 wherein the alignment means comprises a rounded top portion of said first spacer which contacts the bracket to support the glazing at said predetermined distance therefrom.

* * * * *